Feb. 22, 1938.   O. MUELLER   2,108,991
MECHANICAL MOVEMENT
Filed May 10, 1937   2 Sheets-Sheet 1
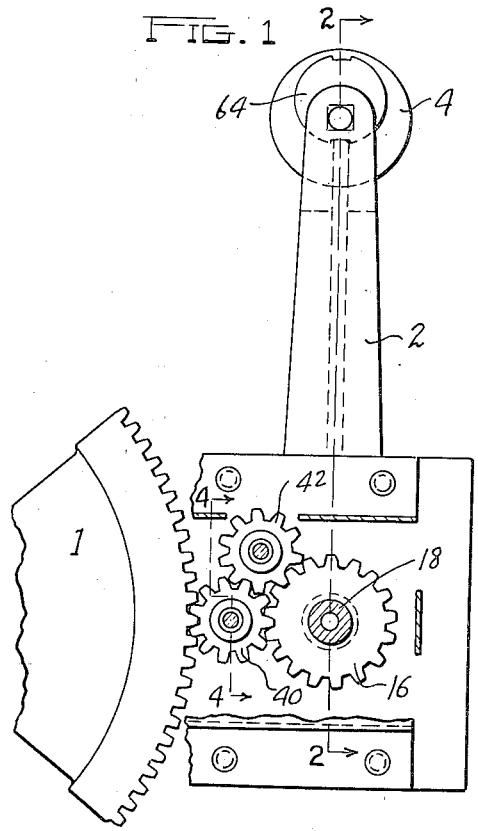
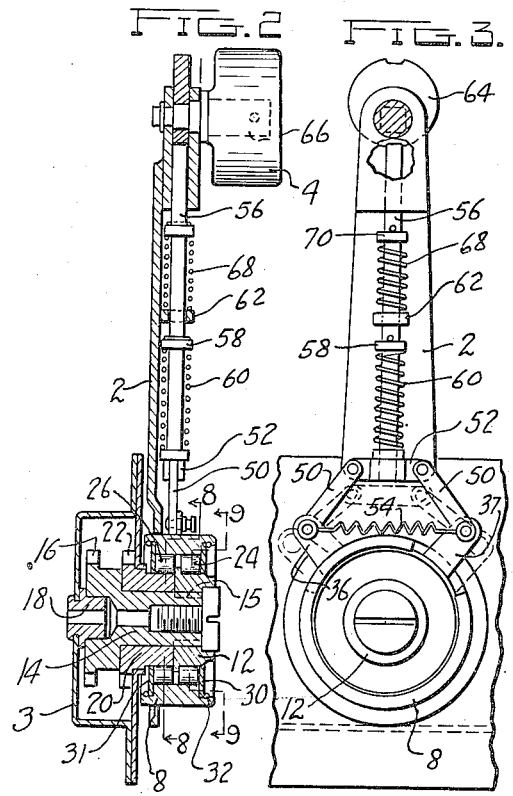
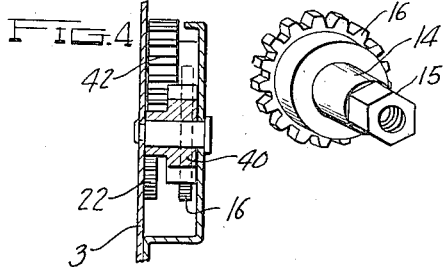
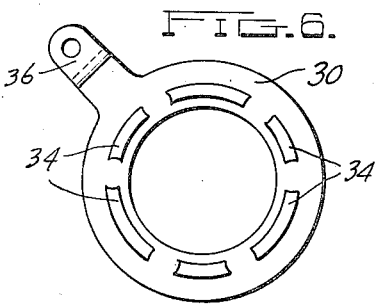
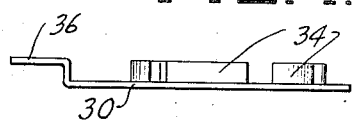
Inventor
Otto Mueller
Owen & Owen
Attorneys Feb. 22, 1938. O. MUELLER 2,108,991
MECHANICAL MOVEMENT
Filed May 10, 1937 2 Sheets-Sheet 2
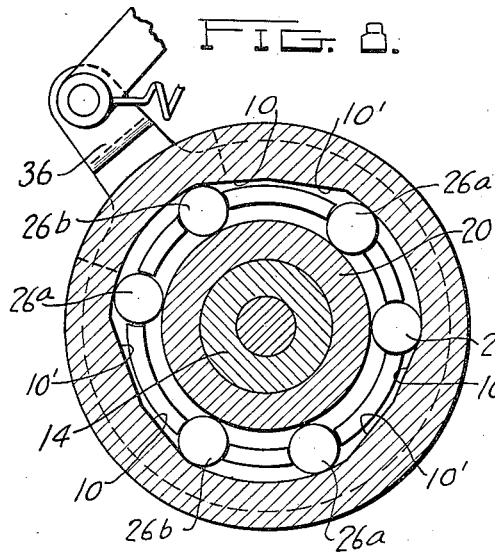
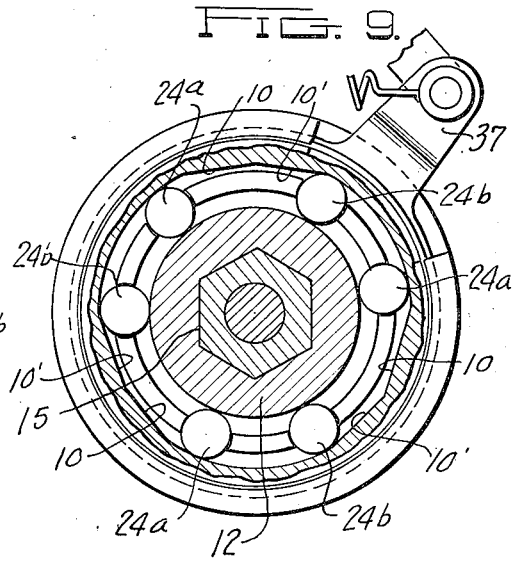
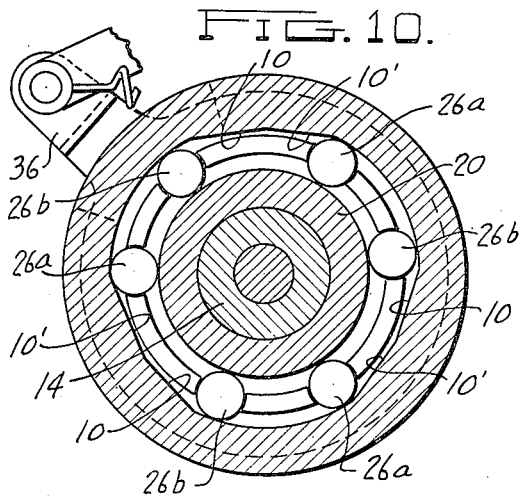
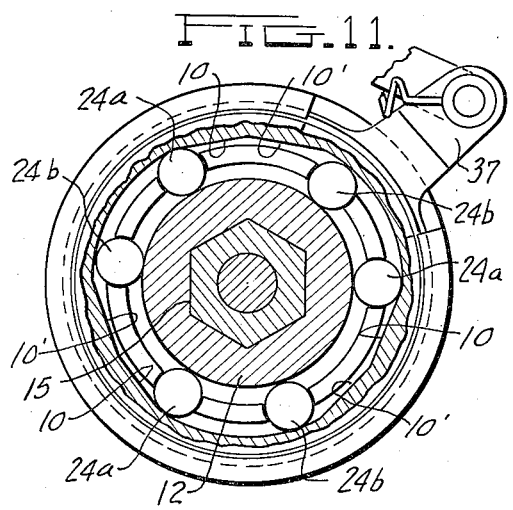
Inventor
Otto Mueller
By Owen & Owen
Attorneys Patented Feb. 22, 1938

2,108,991

UNITED STATES PATENT OFFICE 2,108,991

MECHANICAL MOVEMENT

Otto Mueller, Toledo, Ohio, assignor of one-half to Robert R. Strub, Toledo, Ohio Application May 10, 1937, Serial No. 141,623

5 Claims. (Cl. 74—143)

This invention relates to mechanical movements, and has for its primary object the provision of means to produce a continuous unidirectional movement of a driven part from an alternating driving force.

Another object of the invention is the provision of means to transform a reciprocating driving motion in to a continuous unidirectional movement of a driven part without the use of cranks or similar elements having a dead center position, and without any lost motion.

Another object of the invention is the provision of a device of the above character in which the direction of the resulting unidirectional motion may be readily reversed.

Other objects and advantages of the invention will become apparent as the description proceeds, reference being had to the accompanying drawings, in which—

Figure 1 is a fragmentary elevational view, with parts broken away, of one side of a device embodying the present invention; Fig. 2 is a central vertical section taken on line 2—2 of Fig. 1; Fig. 3 is a front elevation with parts broken away and a part in section; Fig. 4 is a section on line 4—4 of Fig. 1; Fig. 5 is a perspective detail view of a part of one of the intermediate driven members; Fig. 6 is a front detail view of a retainer ring; Fig. 7 is a side elevation of the part shown in Fig. 6; Fig. 8 is an enlarged section taken on line 8—8 of Fig. 2; Fig. 9 is an enlarged section taken on line 9—9 of Fig. 2, and Figs. 10 and 11 are views of the parts shown in Figs. 8 and 9 in another driving position.

Referring to the drawings, the present invention is shown embodied in a device to rotate a gear 1 by reciprocating movements of an actuating arm 2. Such an application is found to be useful in connection with window regulators in automobiles in which the gear 1 may be the usual sector gear of the regulator. The mechanism hereinafter described may be installed in the panel of a door by means of a suitable frame 3, with only a knob 4 projecting through a slot in the panel in convenient position for manual operation.

The actuating arm 2 is connected at its lower end to a drive member 8 either directly or by any suitable fastening elements. The drive member 8 is substantially in the form of a cylindrical housing and has spaced flat wedging surfaces 10, 10' formed at intervals around its internal surface. The areas intermediate the wedging surfaces 10, 10' are substantially cylindrical.

A cylindrical intermediate driven member 12 is disposed concentrically with the cylindrical housing 8 and is fitted on a rearwardly extending shaft 14 by means of an angular head 15 (Fig. 5). A pinion 16 is formed on the rear end of the shaft 14 and the shaft has an end bearing over a journal 18 fixed to the frame 3.

A second intermediate driven member 20 is journaled for free turning movements on the shaft 14 at the rear of the member 12 and has a cylindrical surface of the same diameter as the cylindrical surface of the member 12. The member 20 is further provided with a pinion 22 at its rear end of the same diameter as the pinion 16.

The cylindrical surfaces of the intermediate driven members 12 and 20 lie inside of the interior cam surface of the drive member 8 and cooperate therewith to form two overrunning clutch parts. In the embodiment shown, two sets of drive rollers 24 and 26 are respectively disposed between the driven members 12 and 20 and the drive member 8. Each of the series of drive rollers consists of six units, three of which are designated 24ᵃ and 26ᵃ, respectively, and three of which are designated 24ᵇ and 26ᵇ, respectively, for purposes which will presently become apparent.

Each set of drive rollers is held in place by a respective retainer ring 30, 31, which are held within end recesses in the drive member 8 by any suitable means, such as small retaining springs 32 (Fig. 2). The rollers are held between fingers 34 projecting from the surface of the retainer ring.

Control fingers 36 and 37 project radially from the respective rings 30 and 31 beyond the periphery of the drive member 8 through cutaway portions therein. The rings 30 and 31 thus lie in spaced parallel planes and the terminal end portions of the fingers 36 and 37 are offset toward each other so as to lie substantially in a common intermediate plane. The control fingers 36 and 37 determine the position of the sets of rollers 24 and 26 with respect to the drive member 8 and, as will be hereinafter described, in this way determine the direction of the motion transmitted from drive member 8 to intermediate driven members 12 and 20.

An ultimate drive gear 40 is journaled in the rear of the housing 3 and is constantly in mesh with the pinion 16 and with a second gear 42, which is also journaled in the housing 3. The gear 42 is constantly in mesh with the pinion 22, but as shown in Fig. 4 is of insufficient width to span the distance between the pinions 16 and 22 so that it is out of engagement with pinion 16. Thus, if pinions 16 and 22 rotate in opposite directions, pinion 40 will rotate always in the same direction since, if it derives driving force from pinion 16, such force will be directly transmitted, and, if it derives driving force from pinion 22, such force will be transmitted through idler gear 42.

The adjustment of the retainer rings 30, 31 is such that the rollers 24 and 26 are simultaneously operated as clutch members on reverse movements of the drive member 8. Thus, when the retainer rings are in the position shown in Figs. 8 and 9, at the upper limit of their movement, rollers 24$^b$ and 26$^b$ are in driving position with respect to the cam surfaces 10' and 10, respectively, and rollers 24$^a$ and 26$^a$ are between concentric surfaces of the driving member 8 and intermediate driven members 12 and 20 and are hence incapable of transmitting a driving force. It will be seen that rollers 24$^b$ are disposed to engage the cam surfaces 10' so that they act as clutch members only when such surfaces tend to approach them, as in a clockwise movement of the drive member 8 in Fig. 9. At the same time the rollers 26$^b$ are in operative position with the other cam surfaces 10 and they will act as clutch members only in a counterclockwise movement of the drive member 8. It will, therefore, be seen that one of the two sets of rollers 24$^b$ or 26$^b$ will drive its respective intermediate driven member regardless of the direction of rotation of the drive member 8, and while one set is transmitting force, the other set is merely overrunning. It will also be appreciated that the driving force is continuous since no lost motion is present in the change from overrunning to driving position of a roller.

With the parts in the position above noted, it will be seen that reciprocation of the actuating arm 2 will cause the intermediate driven members 12 and 20 to be turned in opposite directions on successive strokes of the arm. Since pinion 16 turns with the intermediate driven member 12 and since pinion 22 turns with the intermediate driven member 20, it will be apparent that the two pinions will be turned in opposite directions. As above set forth, opposite rotation of the two pinions produces a continuous, unidirectional rotation of the ultimate driven gear 40.

The present invention also provides a means to reverse the direction of rotation of the ultimate driven gear 40. This is accomplished by changing the position of the drive rollers so that those rollers which are held between concentric parts of the drive member 8 and the respective intermediate driven members now move to driving position against a flat part of the interior of the drive member. The new positions of the parts are shown in Figs. 10 and 11. It will therefore be seen that rollers 24$^a$ have been moved against the flat surfaces 10 while rollers 24$^b$ have been moved away from flat surfaces 10' to stand between the concentric driving and driven parts. In this position it will require a counterclockwise movement of the drive member 8 to move the intermediate driven member 12, or a movement opposite to that previously described. Similarly, rollers 26$^b$ are moved to inoperative position, while rollers 26$^a$ are moved to operative position against the flat surfaces 10' and the direction of the force which these rollers are capable of transmitting is opposite to the force transmitted by rollers 26$^b$.

The control of the rollers is effected by moving the respective retaining rings 30 through the medium of the outstanding control fingers 36. Each finger 36 is connected by a link 50 to a toggle link 52. The fingers are further connected to each other and urged together by a spring 54. A stem 56 is provided which carries a collar 58 intermediate its ends and a stiff coil spring 60 is disposed between the collar and the toggle link 52 to form a resilient driving connection for the latter from vertical movement of the stem. The stem 56 extends upwardly through a lug 62 carried on the actuating arm 2 and bears at its upper end against an eccentric 64 mounted on a forwardly extending shaft 66, which carries the knob 4. The stem 56 is urged against the cam 64 by a coil spring 68, which bears at one end against the lug 62 and at its opposite end against a collar 70 carried by the stem. Thus, when the eccentric stands in one position the stem will be forced upwardly by the spring and the fingers 36 will be brought together by the coil spring 54. This is the "upper limit" of their movement and the parts now stand in the positions shown in Figs. 8 and 9. When the eccentric 64 is turned through an angle of 180° or until its point of greatest eccentricity is reached, the stem 56 will be forced downwardly and will move the toggle link 52 downwardly and hence force the fingers 36 apart to the dotted line position shown in Fig. 3. As the fingers move apart against the tension of the spring 54, the rollers are moved to the second position shown in Figs. 10 and 11 and reciprocation of the actuating arm 2 will cause a reverse rotation of the ultimate driven gear 40.

Obviously, the eccentric 64 may be made in the form of a cam having any desired configuration so that the change in angular position of the knob 4 required to reverse the motion of the ultimate driven gear 40 may be made any desired angle.

While the invention has been disclosed in connection with a manually actuated drive member, it should be expressly understood that such disclosure is entirely by way of illustration and that any suitable actuating means may be used. Numerous other changes will suggest themselves to those skilled in the art as the mechanical movement is adapted to different requirements. These changes may be made without departing from the invention as defined in the appended claims.

Having thus described my invention, what I claim as new, and desire to secure by United States Letters Patent, is:

1. Means to transform a reciprocating driving motion into a unidirectional motion which includes, a drive member, an ultimate driven member, two intermediate driven members separately connected to said ultimate driven member, and separate oppositely acting clutch means interposed between each of said intermediate driven members and said drive member.

2. Means to transform a reciprocating driving motion into a unidirectional motion which includes, a drive member having an internal cam surface, an ultimate driven member, two intermediate driven members separately connected to said ultimate driven member, each of said intermediate driven members having cylindrical surfaces cooperatively associated with the interior cam surface of said drive member, and separate oppositely acting clutch members interposed between each of said intermediate driven members and said drive member.

3. Means to transform a reciprocating driving motion into a unidirectional motion which includes, a drive member having an internal cam surface, an ultimate driven member, two intermediate driven members each having a cylindrical surface cooperatively associated with the interior cam surface of said drive member, pinions driven by said intermediate driven members, one of said pinions being directly connected to said ultimate driven member and the other of said pinions being connected to said ultimate driven member through an idler gear, and separate oppositely acting clutch rollers interposed between each of said intermediate driven members and said drive member.

4. Means to transform a reciprocating driving motion into a unidirectional motion which includes, a drive member having an internal cam surface, two intermediate driven members disposed within said drive member, a set of drive rollers interposed between each of said intermediate driven members and the cam surface of said drive member, a retainer for each set of drive rollers, means to move said retainers to positions such that each set of drive rollers is adapted to transmit an oppositely directed driving force, concentric driven shafts connected to the respective intermediate driven members, pinions on each of said shafts, and a gear meshing with each pinion, said gears also meshing with each other, one of said gears constituting an ultimate driven member.

5. Means to transform a reciprocating driving motion into a unidirectional motion which includes, a drive member, an ultimate driven member, two intermediate driven members separately connected to said ultimate driven member, separate oppositely acting overrunning clutch means interposed between each of said intermediate driven members and said drive member, and selective means to control the direction of motion transmissible through each of said overrunning clutch means.

OTTO MUELLER.